(12) United States Patent
Belser

(10) Patent No.: US 6,331,968 B1
(45) Date of Patent: Dec. 18, 2001

(54) SYSTEM AND METHOD TO COMPENSATE FOR DATA DEFECTS WITHIN A MAGNETO-OPTICAL COMPUTER MEMORY DEVICE

(75) Inventor: Karl A. Belser, San Jose, CA (US)

(73) Assignee: Seagate Technology, Scotts Valley, CA (US)

(*) Notice: Subject to any disclaimer, the term of this patent is extended or adjusted under 35 U.S.C. 154(b) by 0 days.

(21) Appl. No.: 09/196,902

(22) Filed: Nov. 19, 1998

Related U.S. Application Data

(63) Continuation of application No. 08/825,651, filed on Apr. 3, 1997, now Pat. No. 5,892,745.
(60) Provisional application No. 60/022,775, filed on Jul. 30, 1996, provisional application No. 60/023,476, filed on Aug. 6, 1996, and provisional application No. 60/025,801, filed on Aug. 27, 1996.

(51) Int. Cl.[7] .................................................. G11B 15/52
(52) U.S. Cl. ...................................... 369/47.14; 369/53.16
(58) Field of Search .................................... 369/13, 44.32, 369/44.35, 44.29, 47, 48, 53, 54, 58, 59, 124.01, 47.14, 47.17, 47.18, 53.15, 53.16, 53.17, 53.32, 53.33, 59.11, 110; 360/25, 67

(56) References Cited

U.S. PATENT DOCUMENTS 5,363,352 * 11/1994 Tobita et al. .................... 369/47 X
5,892,745 * 4/1999 Belser ................................ 369/54

* cited by examiner

Primary Examiner—Paul W. Huber
(74) Attorney, Agent, or Firm—Simon & Koerner LLP

(57) ABSTRACT

A system and method to compensate for data defects within a magneto-optical computer memory device comprises a data channel coupled to the memory device for receiving and processing data signals, and a detector channel coupled to the data channel for detecting the data defects and then generating corresponding defect-skipping pulses. The data channel responsively uses the defect-skipping pulses to compensate for the data defects and thus maintain reliability of the data signals.

11 Claims, 8 Drawing Sheets

SYSTEM AND METHOD TO COMPENSATE FOR DATA DEFECTS WITHIN A MAGNETO-OPTICAL COMPUTER MEMORY DEVICE

CROSS-REFERENCE TO RELATED APPLICATION

This application is a continuation of patent application Ser. No. 08/825,651, entitled "System And Method To Compensate For Data Defects Within A Magneto-Optical Computer Memory Device," filed on Apr. 3, 1997, now U.S. Pat. No. 5,892,745; Provisional Application Ser. No 60/022,775, entitled "A Data Storage And Retrieval System Based on Flying Magneto-Optical Head," filed on Jul. 30, 1996; Provisional Application Ser. No. 60/023,476, entitled "A Data Storage And Retrieval System Based on A Flying Magneto-Optical Head," filed on Aug. 6, 1996; and Provisional Application Serial No. 60/025,801, entitled "A Data Storage And Retrieval System Based on A Flying Magneto-Optical Head," filed on Aug. 27, 1996. The subject matter of each of these related applications is incorporated herein by reference. All related applications are commonly assigned.

BACKGROUND OF THE INVENTION

1. Field of the Invention

This invention relates generally to memory systems and more particularly to a system and method to compensate for data defects within a magneto-optical computer memory device.

2. Description of the Background Art

Providing reliable storage and retrieval techniques for digital information is an important consideration of manufacturers, designers and users of computing systems. In magneto-optical storage devices that use flying heads, digital data is written onto and read from the front surfaces of rotating disks of MO storage media. Referring now to FIG. 1(a), a plan view of a front surface 112 of a magneto-optical storage medium 110 is shown. In magneto-optical storage devices, digital data is typically written into and read from a series of concentric or spiral tracks 114 located on the surface 112 of storage medium 110. In practice, the digital data is read from the front surface 112 of storage medium 110 by projecting a laser-generated light beam from a flying head onto a selected track 114 while storage medium 110 is rotating, and then sensing the amplitude and polarization of light reflected back from the surface 112 of storage medium 110.

Referring now to FIG. 1(b), a cross-sectional view of the FIG. 1 magneto-optical storage medium 110 is shown. In operation, a flying head (not shown) is positioned above front surface 112. FIG. 1(b) includes several examples which illustrate possible causes of unreliable or invalid data in magneto-optical storage devices. The FIG. 1(b) examples include a corrosion defect 116, particulate contamination 118 and a "bright spot" 120. These examples are presented for purposes of illustration and defective data may readily be caused by various other factors.

The FIG. 1(b) examples each significantly alter the data read from the surface 112 of storage medium 110. Corrosion defect 116 and particulate contamination 118 each reduce the reflective properties of surface 112. This change in reflectivity reduces the MO signal amplitude of data read from storage medium 110. In contrast, bright spot 120 causes increased reflectivity in surface 112. This increase also reduces the mark sizes of data stored on storage medium 110, because bright spot 120 reflects the laser beam used to heat storage medium 110 during the data writing process. Bright spot 120 thus prevents data from being effectively written to storage medium 110.

In addition, front surface media is more prone to significant data defects due to causes such as particulate contamination 118. Conventional MO media has an active layer buried some distance below the media surface. Particulate contamination on conventional MO media may therefore be out-of-focus and hence unreadable. In contrast, the present invention uses front surface media 110 above which a flying recording head (containing optics and magnetic-field modulation coils) is used to record and sense MO data marks directly from the front surface 112 of storage medium 110. Particulate contamination 118 on front surface 112 thus has a greater impact on the data signal read from storage medium 110.

As discussed above, corrosion defects 116, particulate contamination 118, and bright spots 120 may cause data defects in front surface magneto-optical storage devices. Furthermore, magneto-optical storage devices may be unable to compensate for these data defects. Magneto-optical devices often contain automatic gain controls (AGCs) to control data amplitude and phase-locked oscillators (PLOs) to synchronize the data flow. A significant dropout or data defect, however, may disrupt AGC and PLO operation so severely that the magneto-optical device is unable to restore normal data amplitude or data synchronization. From the above discussion,. it becomes apparent that the magneto-optical data is not sufficiently robust to defects. Therefore, an improved system and method are needed to compensate for data defects within a front surface media magneto-optical memory device.

SUMMARY OF THE INVENTION

In accordance with the present invention, a system and method are disclosed to compensate for data defects within a magneto-optical memory device. In the preferred embodiment of the present invention, a magneto-optical drive optically reads information stored on a magneto-optical storage medium and then derives separate electrical MO+ and MO− signals using an optics assembly which includes a polarizing beam splitter and separate photo-detectors for the MO+ and MO− signals. A data channel coupled to the magneto-optical drive then subtracts the MO+ and MO− signals using an inverting amplifier and a summing amplifier to responsively generate and provide an analog data signal to a converter device.

A reflectivity channel coupled to the data channel accesses and combines the MO+ and MO− signals using a summing amplifier to responsively generate and provide a reflectivity signal to a detector device. The detector then preferably detects the received reflectivity signal using threshold detection techniques to generate a coast signal to both a phase-locked oscillator and to an automatic gain controller in the converter device. The detector device also provides the coast signal to a delay device for generating an error pointer signal to an error-correction coding (ECC) decoder device in the data channel.

When a data defect occurs, the magneto-optical drive uses the generated coast signal to maintain constant automatic gain control (AGC) or phase-locked oscillator (PLO) control signals during the period of the data defect period. In practice, the defective data signal is delayed so the generated coast signal may then be applied in a timely manner to automatic gain control and the phase-locked oscillator within the converter device. The automatic gain control and phase-locked oscillator responsively maintain their pre-defect states until the data defect passes through and valid data levels return. The coast signal thus effectively serves as a "defect-skipping" pulse.

The magneto-optical drive also uses the coast signal to provide the location of the data defect to the ECC decoder device for error correction. In practice, a delay device receives the coast signal and responsively generates an error pointer signal that is advantageously synchronized with the corresponding data defect. The decoder device may then specifically identify the location of the particular data defect to more efficiently perform selected error-correction functions. The present invention thus effectively permits magneto-optical drive devices to provide more robust and reliable data to system users.

DETAILED DESCRIPTION OF THE PREFERRED EMBODIMENT

The present invention comprises a system and method to compensate for data defects within a magneto-optical memory device, and includes a data channel coupled to the memory device for receiving and processing data signals, and a detector channel coupled to the data channel for identifying data defects and then responsively generating corresponding coast signals. The data channel then uses the coast signal to compensate for the data defects and thus maintains the reliability of the data signals.

Figure 1A:
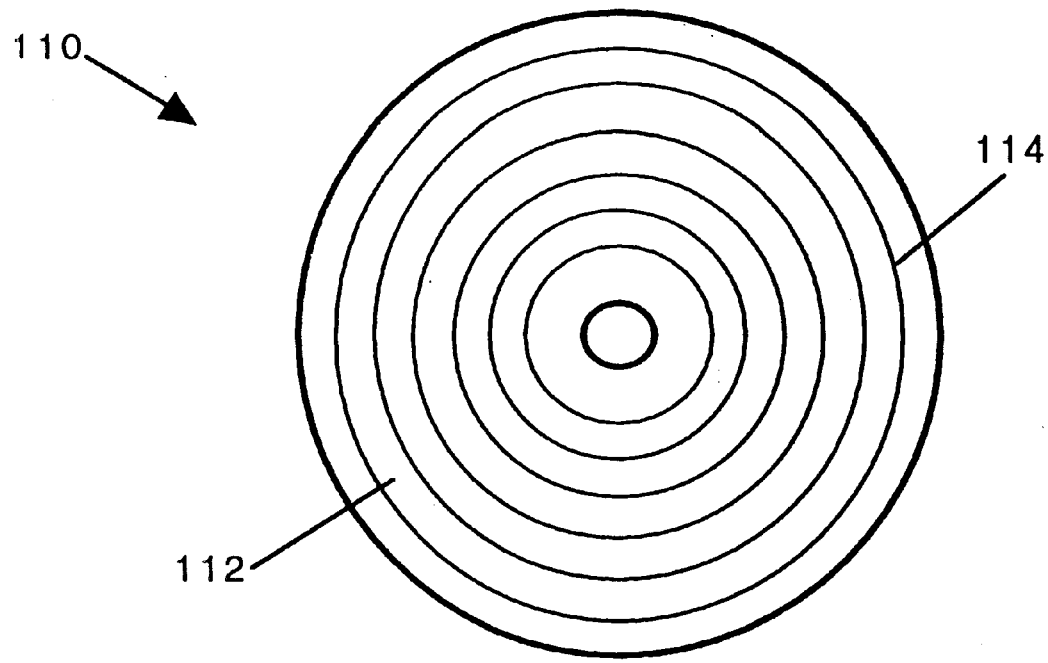
FIG. 1(a) is a plan view of a front surface magneto-optical storage medium, according to the present invention.
Figure 1B:
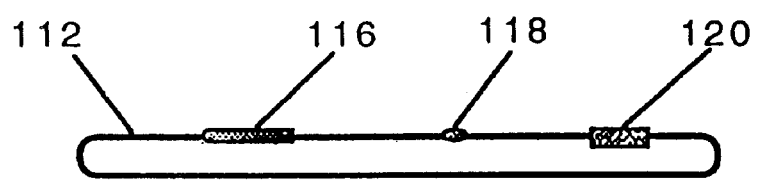
FIG. 1(b) is a cross-sectional view of the front surface magneto-optical storage medium of FIG. 1(a) including several possible causes of data defects.
Figure 1B:
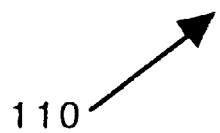
Figure 2:
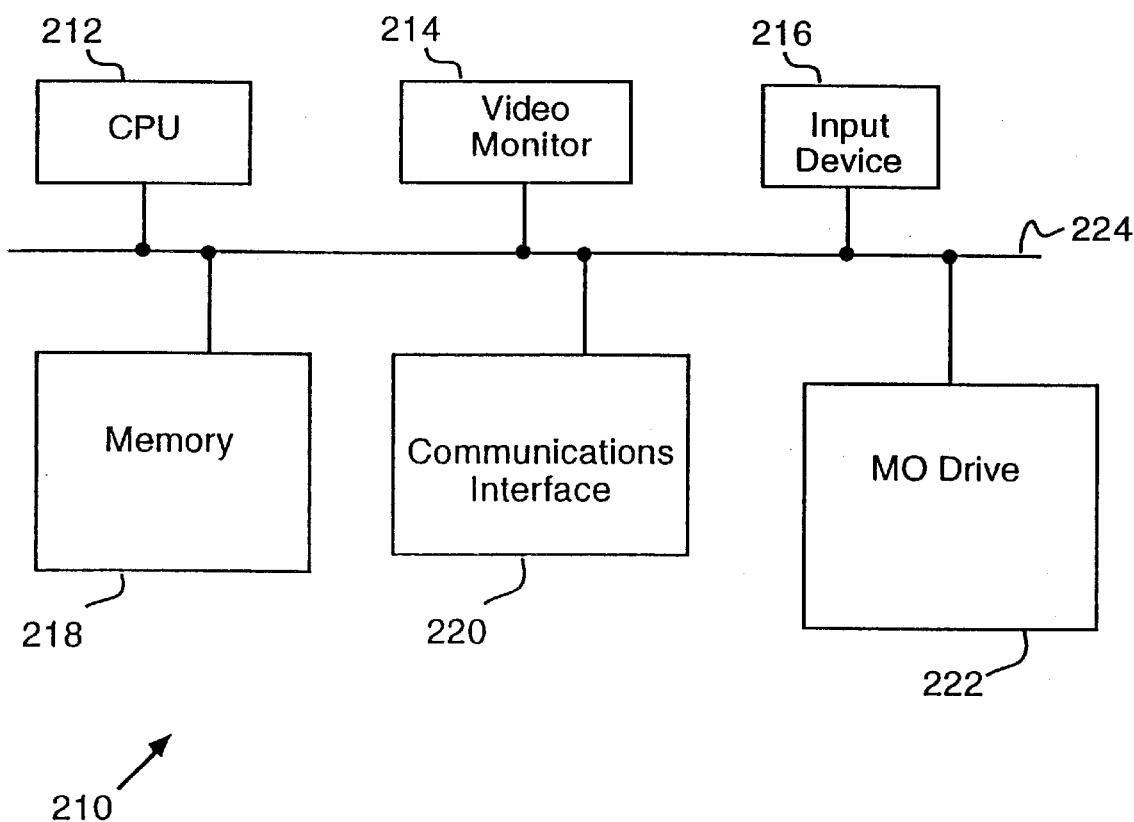
FIG. 2 is a block diagram of a computer system including a magneto-optical drive, according to the present invention.

Referring now to FIG. 2, a computer 210 is shown according to the present invention. Computer 210 preferably comprises a central processing unit (CPU) 212, a video monitor 214, an input device 216, a memory 218, a communications interface 220 and a magneto-optical drive 222. Each element of computer 210 is preferably coupled to a common system bus 224. Memory 218 may alternatively comprise various storage-device configurations, including Random-Access-Memory (RAM), Read-Only-Memory (ROM) and non-volatile storage devices such as floppy-disks. Magneto-optical drive 222 receives, stores and retrieves various types of digital information and is further discussed below in conjunction with FIGS. 3 through 8.

Figure 3:
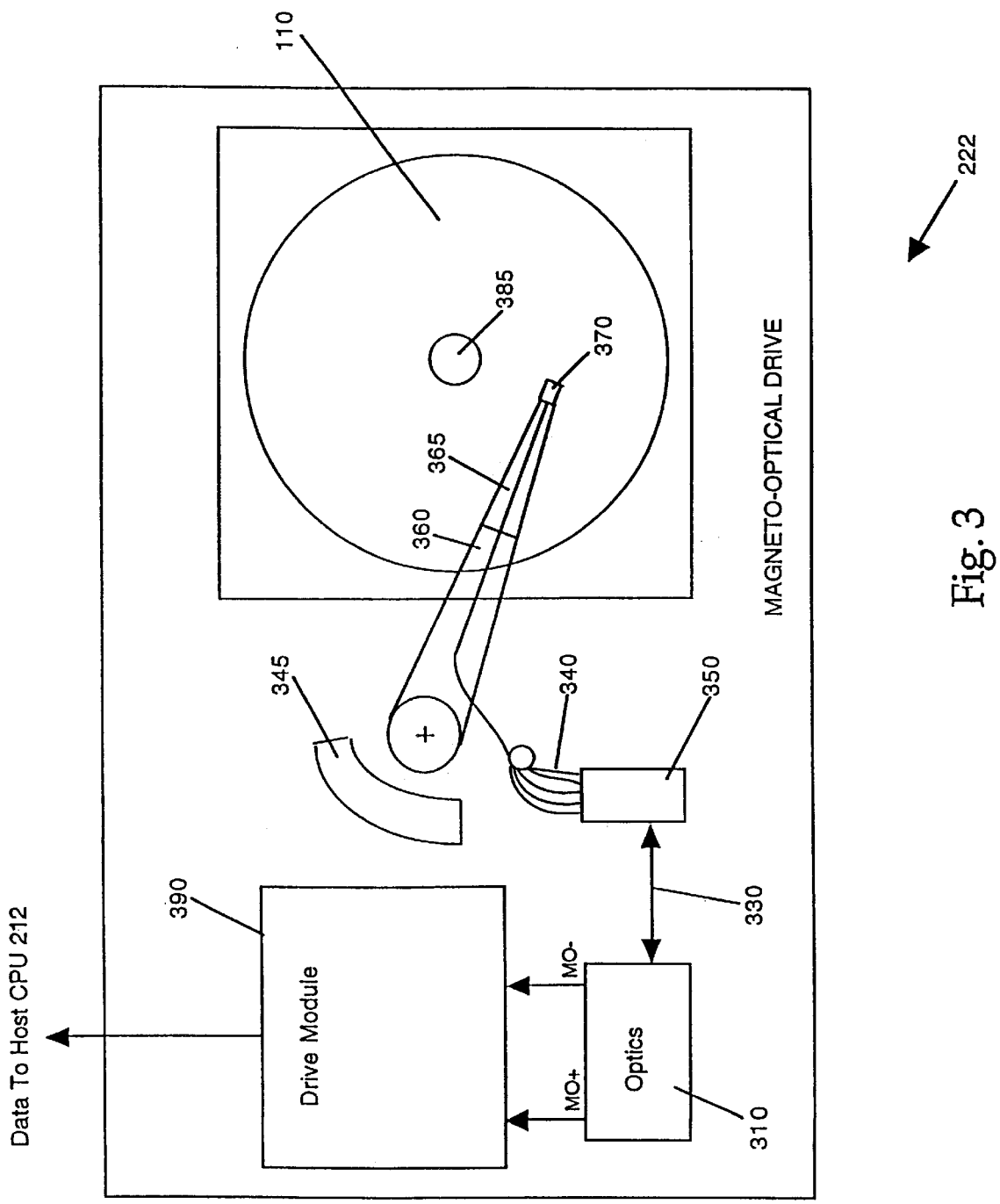
FIG. 3 is a pictorial view of the magneto-optical drive of FIG. 2, according to the present invention.

Referring now to FIG. 3, a pictorial view of the FIG. 2 magneto-optical drive 222 is shown. In the present invention, the mechanical architecture of magneto-optical drive 222 incorporates Flying Magneto-Optical (FMO) head technology with Winchester-type rotary actuator arm, suspension, and air bearing technology in a Magneto-Optical (MO) data storage system. In the preferred embodiment, magneto-optical drive 222 includes optics assembly 310, a Single-Mode Polarization Maintaining (SMPM) optical fiber 330, a fiber optic switch 350, an actuator magnet and coil 345, a plurality of SMPM optical fibers 340, a plurality of head arms 360, a plurality of suspensions 365, a plurality of FMO heads 370 and a plurality of MO storage media 110.

Each of the plurality of MO storage media 110 are preferably mounted on a spindle 385 for continuous rotation at a constant angular velocity and each of the plurality of FMO heads 370 are preferably attached via a respective flexible suspension 365 and head arm 360 to the electro-magnetic actuator magnet and coil 345. Those skilled in the art will recognize that MO drive 222 may comprise as few as one FMO head 370 and one MO storage medium 110 or an upper and lower FMO head 370 per a plurality of MO storage media 110.

Figure 4:
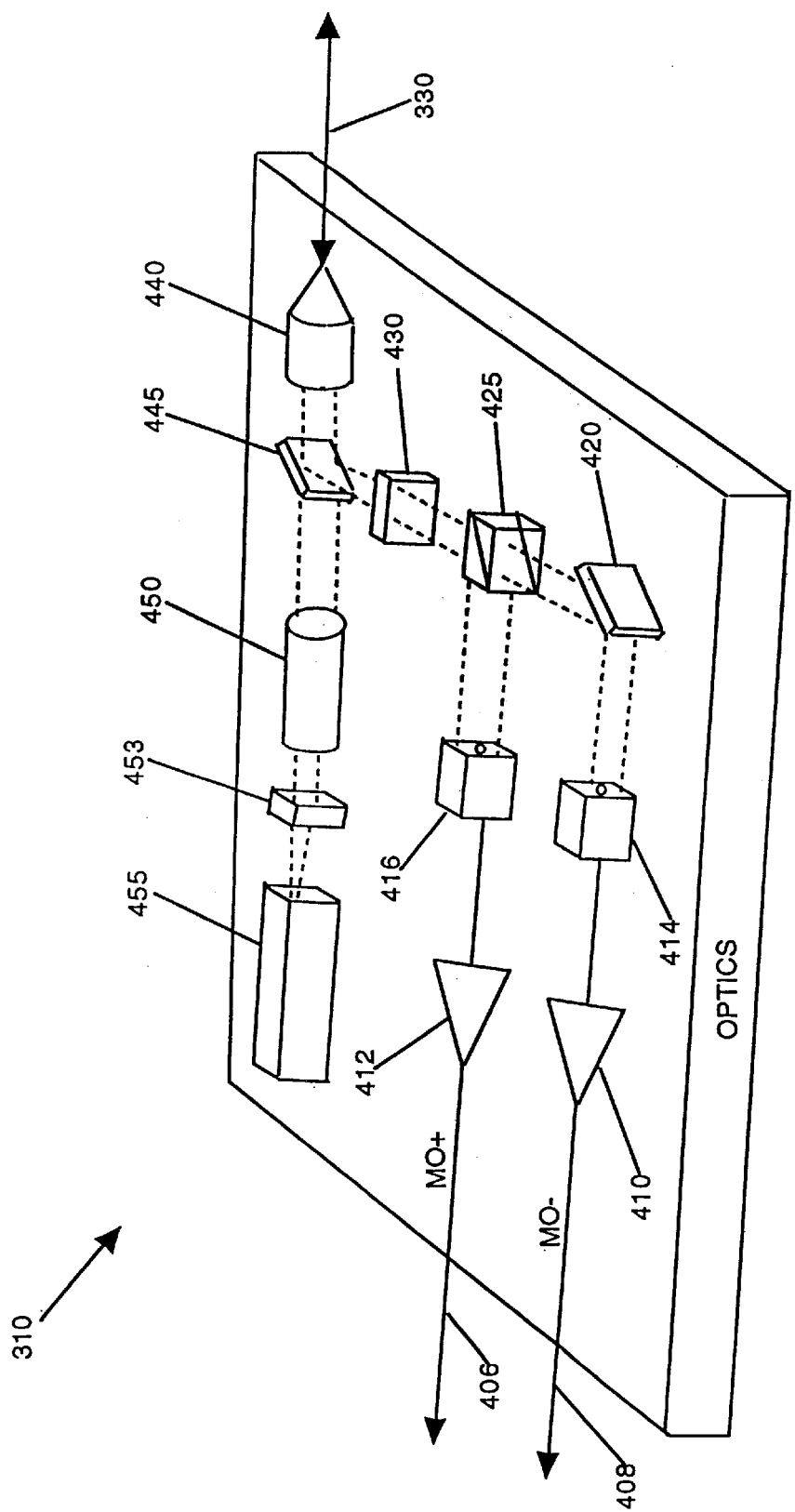
FIG. 4 is a schematic view of the optics assembly of FIG. 3, according to the present invention.

Referring now to FIG. 4, a schematic view of the FIG. 3 optics assembly 310 is shown. Optics assembly 310 includes a laser optical source, a photo-detector system and associated optical components, preferably as a separate subassembly 310 or alternatively as a hybrid integrated circuit component. In the preferred embodiment, optics assembly 310 further includes a distributed feedback (DFB) laser diode 455 polarized optical light source operating in the visible or near ultraviolet region, a leaky beam splitter 445, collimating optics 450 and an optical isolator 453 that are used before passing the laser light from the laser diode 455 to leaky beam splitter 445, and a coupling lens 440 that is preferably a Gradient Refractive Index (GRIN) lens that focuses outgoing light from leaky beam splitter 445 into a Single-Mode Polarization-Maintaining (SMPM) optical fiber 330 feed.

In the preferred embodiment, fiber optic switch 350 (FIG. 2) accepts optical fiber 330 at an input port and routes the light emanating from fiber 330 to one of the optical fibers 340 at an output port. The switching properties of fiber optic switch 350 are bi-directional so that light propagating back to the switch 350 along any one of the SMPM optical fibers 340 at the output port may also be routed to the optical fiber 330 at the input port. The SMPM optical fibers 340 from the fiber optic switch 350 are preferably routed along respective head arms 360 and suspensions 365 to respective flying magneto-optical heads 370.

In the preferred embodiment, during writing, light is delivered through an individual optical fiber 340 to a respective FMO head 370 for the purpose of locally heating a respective surface of a rotating magneto-optical storage media 110, thereby producing a "hot spot." A magnetic coil embedded on FMO head 370 is used to produce a magnetic field that in turn spontaneously magnetizes the region within the hot spot with a vertical orientation either up or down. Thus, as MO storage medium 110 rotates, the applied magnetic field is modulated so as to encode digital data as a pattern of "up or down" magnetic domain orientations.

During readout, polarized light at a lower intensity is delivered through an SMPM optical fiber 340 to a respective FMO head 370 for the purpose of probing rotating storage medium 110 with a focused optical light beam spot. The readout is performed in such a way that the magnetization direction at the focused spot on storage medium 110 alters the optical polarization of the reflected light via the magneto-optic Kerr effect. The readout process thus produces either positively-rotated light or negatively-rotated light. In this way, the pattern of up or down magnetization orientations (representative of the stored digital data) modulates the polarization of the light reflected from storage medium 110. In addition to data information, storage medium 110 also contains pre-recorded servo information which MO drive 222 reads and then uses to correctly position head 370 over a selected track 114 on storage medium 110.

The reflected light signal from storage medium 110 couples back through the FMO head 370, one of the plurality of SMPM optical fibers 340, and the fiber optic switch 350, and finally reaches lens 440 via optical fiber 330. Leaky beam splitter 445 then transmits the reflected light signal through half-wave plate 430 to polarizing beam splitter 425 which discriminates against positive and negative planes of polarization in the received light. Polarizing beam splitter 425 thus sends reflected light having a positive plane of polarization to photo-detector 416, and also sends reflected light having a negative plane of polarization to photo-detector 414.

Photo-detector 416 responsively converts the positively-rotated light into a proportional analog voltage which is amplified by preamplifier 412 before being transmitted to drive module 390 via line 406. Likewise, photo-detector 414 responsively converts the negatively-rotated light into a proportional analog voltage which is amplified by preamplifier 410 before being transmitted to drive module 390 via line 408.

Figure 5:
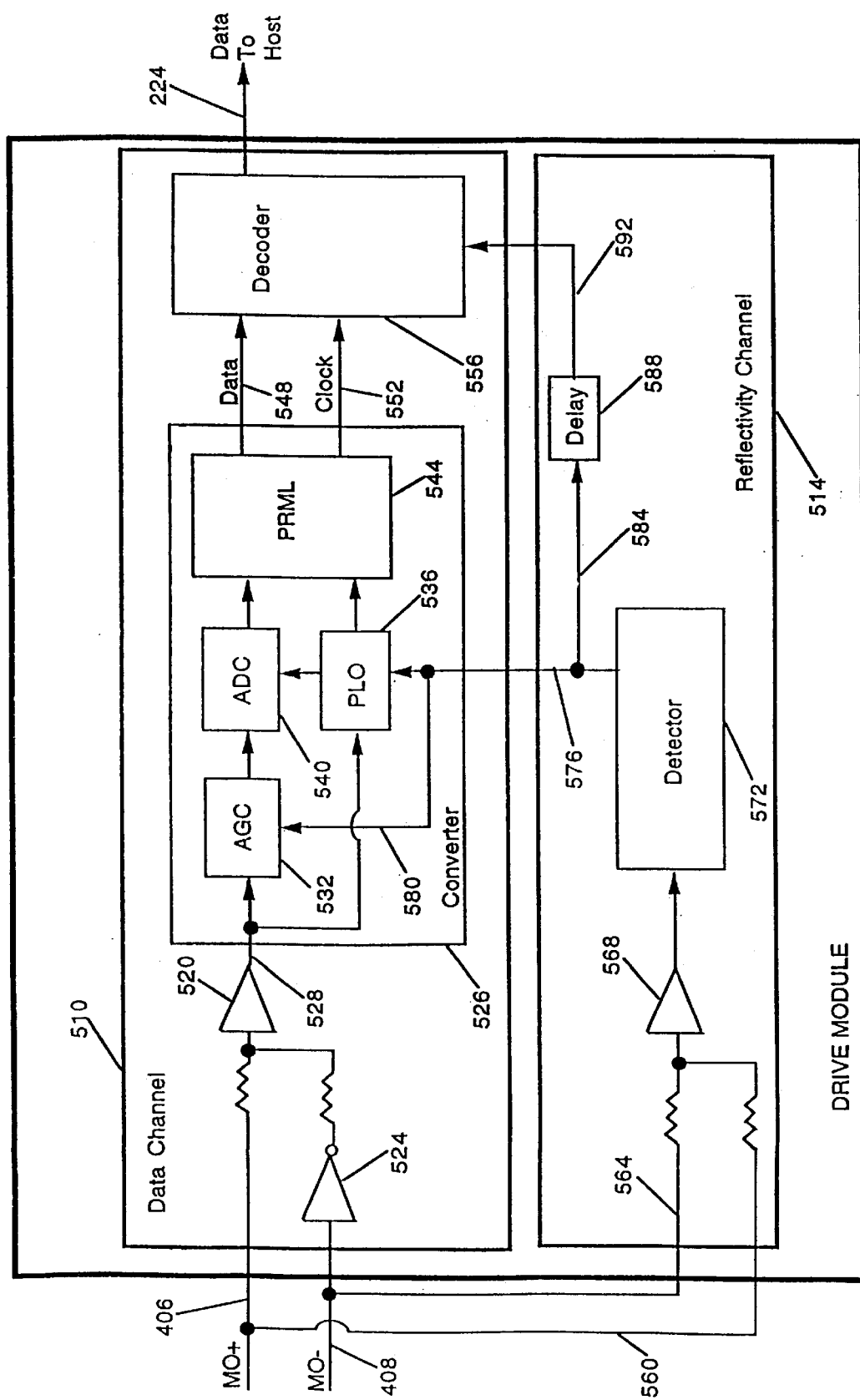
FIG. 5 is a schematic diagram of the preferred embodiment for the drive module of FIG. 3, including a data channel and a reflectivity channel.

Referring now to FIG. 5, a schematic diagram of the preferred embodiment for the FIG. 3 drive module 390 is shown. In the preferred embodiment, drive module 390 includes two separate channels (data channel 510 and reflectivity channel 514) because two distinctly different types of light sensing are utilized by magneto-optical drive 222. As discussed above, data channel 510 senses light reflected from storage medium 110 to determine rotation of the plane of polarization (corresponding to each magnetically-recorded domain) and thus responsively generates corresponding digital data.

In contrast, reflectivity channel 514 senses the amplitude of light reflected from storage medium 110. For example, during read mode, the amplitude of reflected light is destructively interfered with whenever the reading light beam strikes the pre-embossed servo pattern impressed upon storage medium 110. Reflectivity channel 514 then responsively utilizes the sensed reflectivity signal to derive necessary servo control information which is used to control selected functions in magneto-optical drive 222. The present invention also advantageously utilizes reflectivity channel 514 to effectively compensate for data defects occurring in magneto-optical drive 222, as discussed below.

In normal operation, data channel 510 receives the MO+ signal from optics assembly 310 via line 406 and receives the MO− signal from optics assembly 310 via line 408. Inverting amplifier 524 then inverts the MO− signal before summing amplifier 520 combines the MO+ signal with the inverted MO− signal to provide an analog data signal to converter 526 via line 528. By combining the MO+ signal with the inverted MO− signal, summing amplifier 520 effectively removes any reflectivity signal information. The analog data signal on line 528 thus represents only the plane of polarization information for the light reflected from storage medium 110.

In the preferred embodiment of the present invention, the input of converter 526 (at line 528) includes a specified amount of electrical propagation delay which delays the analog data signal in accordance with the present invention. Converter 526 provides the analog data signal received on line 528 to an automatic gain controller (AGC) 532 and to a phase-locked oscillator (PLO) 536. In the preferred embodiment, converter 526 utilizes partial response maximum likelihood (PRML) techniques to convert the analog data signal on line 528 into a digital data signal which is output on line 548. Furthermore, converter 526 generates a data clock signal which is output on line 552.

AGC 532 seeks to correct for variations in the amplitude of the received analog data signal and then provides the corrected analog data signal to analog-to-digital converter (ADC) 540. PLO 536 also receives the analog data signal from line 528 and responsively provides timing pulses to ADC 540 and to the PRML circuitry 544. Next, ADC 540 responsively converts the received analog data signal into a corresponding digital data signal that is then provided to the PRML circuitry 544. The digital data signal and the timing pulses from PLO 536 are processed by PRML circuitry 544 to generate a digital data signal on line 548 and a data clock pulse on line 552. Decoder 556 then receives the processed digital data signal on line 548 and the data clock signal on line 552.

In the preferred embodiment, decoder 556 comprises a conventional Reed-Solomon decoder device which uses selected error-correction coding (ECC) techniques to identify and correct errors in the digital data signal on line 548 and then responsively generates a valid digital data signal to host CPU 212 via system bus 224. An important property of Reed-Solomon decoders is that "N" bytes of ECC can correct "N" bytes of erasures (errors of known location), while "N" bytes of ECC can only correct "N/2" errors of unknown location. In other words, a given ECC byte-size will be twice as effective, if error locations can be accurately specified.

To compensate for data defects according to the present invention, reflectivity channel 514 accesses the MO+ signal via line 560 and the MO− signal via line 564 and advantageously combines the accessed MO+ and MO− signals using summing amplifier 568 to generate a reflectivity signal which is received by detector 572. In the preferred embodiment, detector 572 includes a threshold detector device which low-passes the reflectivity signal received from summing amplifier 568 and then detects whenever the low-passed reflectivity signal crosses above or below a specified threshold value (indicating a data defect). If the low-passed reflectivity signal passes above or below the specified threshold value, then detector 572 responsively generates a "coast" signal corresponding with the detected data defect. The coast signal is further described below in conjunction with FIG. 6.

Detector 572 provides the generated coast signal to PLO 536 via line 576 and also provides the coast signal to AGC 532 via lines 576 and 580. As discussed above, the analog data signal from summing amplifier 528 is delayed at the input of converter 526. Therefore, the coast signal may advantageously be timed to cause AGC 532 and PLO 536 to hold their valid pre-defect states through the period of the sensed data defect. The coast signal is thus essentially a "defect-skipping" pulse. In practice, AGC 532 and PLO 536 each include a hold circuit which maintains the current AGC 532 and PLO 536 states in response to the defect-skipping pulse of the received coast signal.

In the preferred embodiment, detector 572 also provides the coast signal via line 584 to delay 588 which then responsively generates and transmits an error pointer signal to decoder 556 via line 592. Delay 588 provides a selected amount of electrical propagation delay to advantageously synchronize the error pointer signal to the corresponding data defect, as discussed below in conjunction with FIG. 7. Delay 588 may effectively be implemented using one or more "D" flip-flops connected in series. Decoder 556 then receives and utilizes the error pointer signal on line 592 to identify the location of the data defect, and thus, advantageously doubles the effectiveness of the error-correction coding functions, as discussed above.

Figure 6:
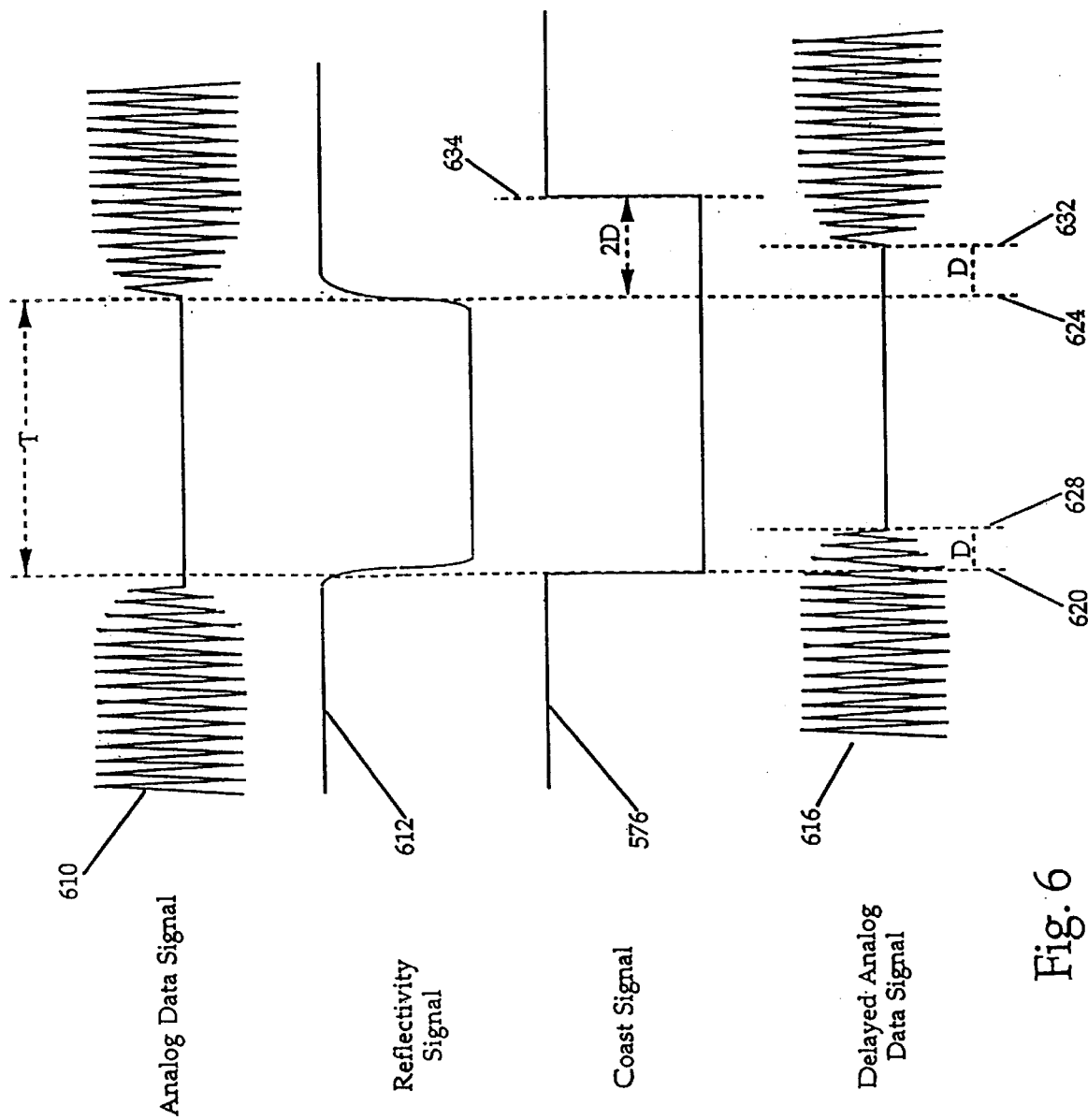
FIG. 6 is a set of coast signal timing waveforms for the drive module of FIG. 3.

Referring now to FIG. 6, a set of coast signal timing waveforms for the FIG. 3 drive module 390 is shown. The FIG. 6 waveforms include the analog data signal 610 generated by summing amplifier 520, the reflectivity signal 612 generated by summing amplifier 568, the coast signal 576 generated by detector 572 and the delayed analog data signal 616 within converter 526. Analog data signal 610 displays a period T (between time 620 and time 624) which corresponds to a data defect sensed on storage medium 110, and which therefore has a significant drop in data signal voltage level. Additionally, analog data signal 610 begins to attenuate shortly before time 620 and also requires a short period after time 624 to reach a normal data level.

Likewise, reflectivity signal 612 exhibits a significant drop in voltage level shortly after time 620 and also returns to a normal level shortly following time 624. In the preferred embodiment, converter 526 delays analog data signal 610 to obtain delayed analog data signal 616. Detector 572 may thus advantageously generate coast signal 576 at time 620 and thereby "coast" AGC 532 and PLO 536 while delayed analog data signal 616 is still valid. The delay period "D" is shown in waveform 616 between times 620 and 628, and also between times 624 and 632. As illustrated in coast signal waveform 576, detector 572 increases the pulse width of coast signal 576 by a period of twice the delay period (period "2D" ending at time 634) to ensure that delayed analog data signal 616 has returned to valid data levels before ending the "defect-skipping" pulse of coast signal 576.

Figure 7:
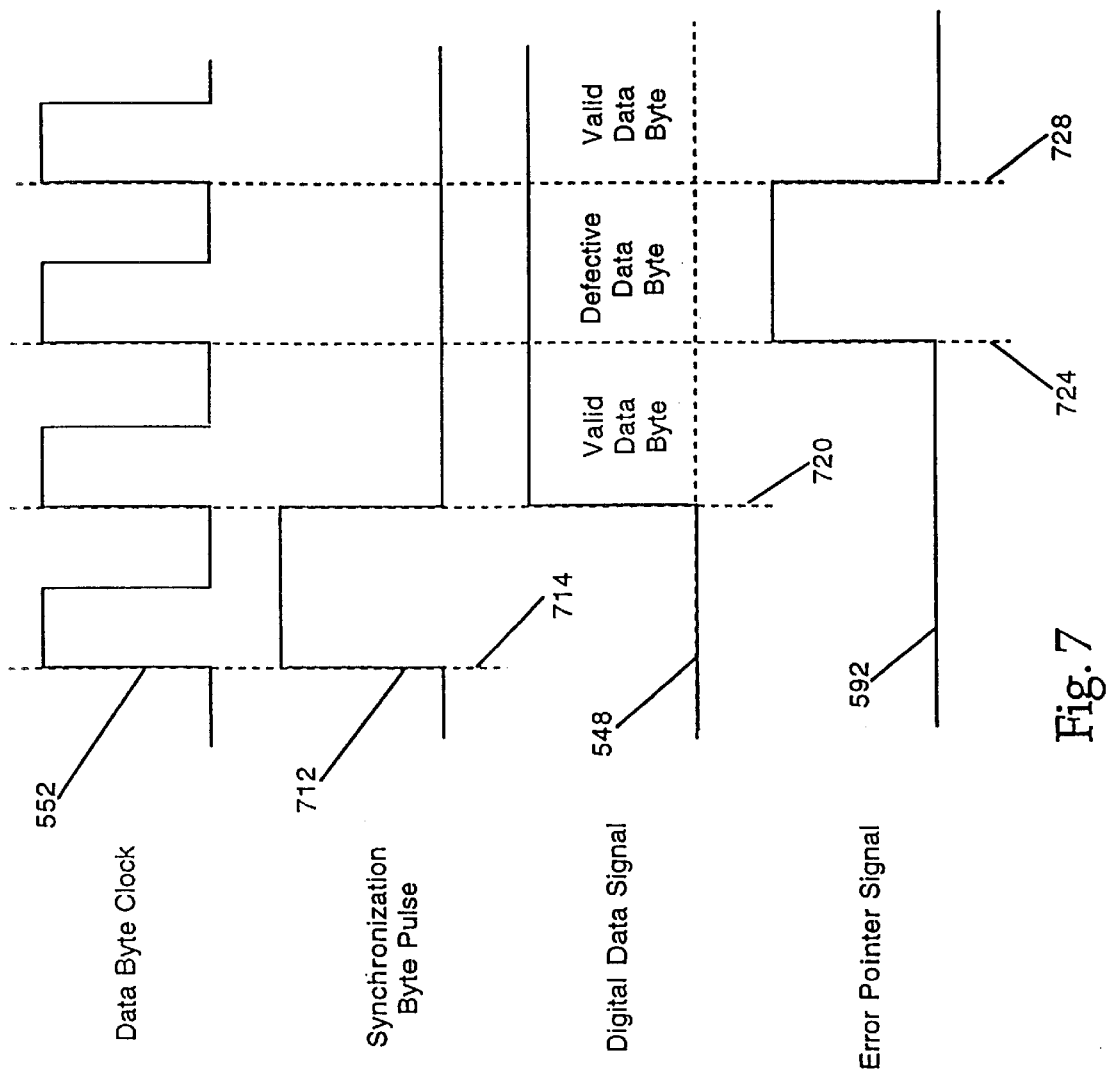
FIG. 7 is a set of error pointer timing waveforms for the drive module of FIG. 3.

Referring now to FIG. 7, a set of error pointer timing waveforms for the FIG. 3 drive module 390 is shown. The FIG. 7 waveforms are from decoder 556 (FIG. 5) and preferably include data byte clock 552, synchronization byte pulse 712, digital data signal 548 and error pointer signal 592. As shown in FIG. 7, the leading edge of data byte clock 552, at time 714, clocks synchronization byte pulse 712 which immediately precedes data byte transmission in digital data signal 548.

At time 720, digital data signal 548 begins to transmit a series of data bytes including a defective byte shown between times 724 and 728. For purposes of illustration, a single defective data byte is shown in FIG. 7. In actual operation, however, significantly more than a single data byte may typically be invalid or defective. As shown in FIG. 7, the present invention advantageously uses delay 588 to synchronize error pointer signal 592 to begin at time 724 and to end at time 728, thereby effectively identifying the location of the defective data byte in digital data 548.

Figure 8:
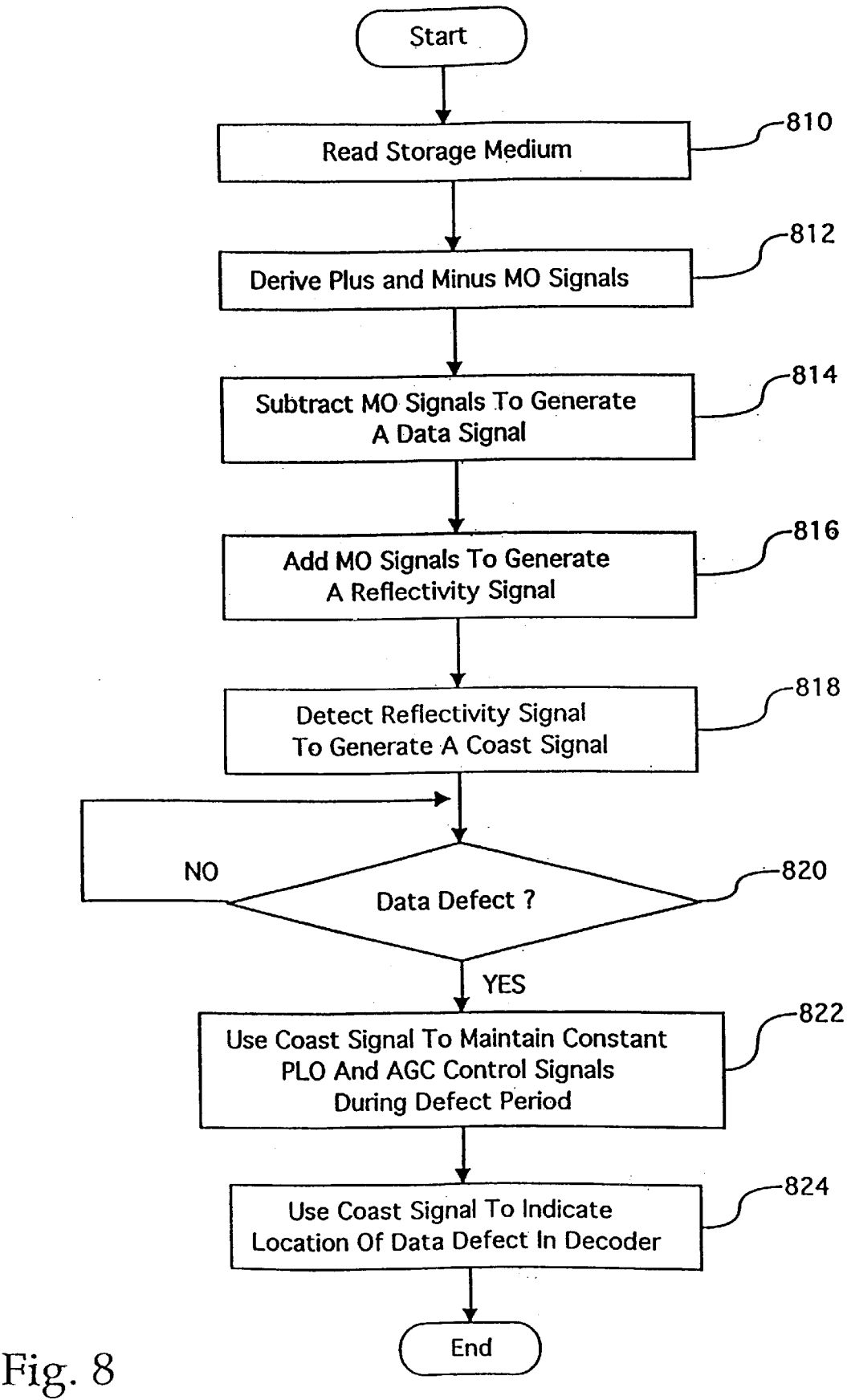
FIG. 8 is a flowchart of preferred method steps to compensate for data defects within a magneto-optical computer memory device, according to the present invention.

Referring now to FIG. 8, a flowchart of preferred method steps to compensate for data defects within magneto-optical drive 222 is shown. Initially, in step 810, magneto-optical drive 222 optically reads information stored on magneto-optical storage medium 110. In step 812, magneto-optical drive 222 then derives separate electrical MO+ and MO– signals using optics assembly 310, including polarizing beam splitter 425 and photo-detectors 414 and 416.

In step 814, data channel 510 then subtracts the MO+ and MO– signals using inverting amplifier 524 and summing amplifier 520 to responsively generate an analog data signal to converter 526. In step 816, reflectivity channel 514 adds the MO+ and MO– signals using summing amplifier 568 to responsively generate a reflectivity signal to detector 572.

Next, in step 818, detector 572 preferably detects the received reflectivity signal using threshold detection techniques to generate a coast signal to PLO 536 and AGC 532 in converter 526. Detector 572 also provides the coast signal to delay 588 for generating an error pointer signal for decoder 556. In step 820, magneto-optical drive 222 then waits until a data defect occurs in the information read from storage medium 110.

When a data defect occurs, magneto-optical drive 222, in step 822, uses the generated coast signal to maintain constant AGC and PLO control signals during the period of defective data read from storage medium 110. In practice, the defective data signal is delayed and the generated coast signal may then be applied in a timely manner to AGC 532 and PLO 536 within converter 526. AGC 532 and PLO 536 responsively maintain their pre-defect states until the data defect passes through and valid data levels return. The coast signal thus effectively serves as a "defect-skipping" pulse.

In step 824, magneto-optical drive 222 also uses the coast signal to provide the location of the data defect to decoder 556. In practice, delay 588 receives the coast signal and responsively generates an error pointer signal that is synchronized with the corresponding data defect. Decoder 556 then may receive the error pointer signal to specifically identify the location of the particular data defect and more efficiently perform selected error-correction functions.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system to compensate for data defects in a memory device, comprising:

a data channel coupled to said memory device for receiving and processing data signals, wherein said data channel determines a rotation of a plane of polarization from a sensed light reflected from a surface of a storage medium to retrieve data; and a detector channel coupled to said data channel for detecting said data defects by analyzing an amplitude of a sensed light reflected from the surface of the storage medium and responsively generating corresponding defect pulses, said data channel receiving said data defect pulses and responsively compensating for said data defects.

2. The system of claim 1, wherein said memory device comprises a magneto-optical disk drive system and corresponding drive circuitry including said data channel and said detector channel.

3. The system of claim 2, wherein said data channel includes an inverting amplifier coupled to a first signal and a first summing amplifier coupled to an output of the inverter for summing the inverted first signal with a second signal to provide an analog signal to a converter device.

4. The system of claim 3, wherein said detector channel includes a second summing amplifier coupled to a detector, wherein said first and second signals are input into said second summing amplifier to provide a reflectivity signal to said detector.

5. The system of claim 4, wherein said detector generates a coast signal when said reflectivity signal crosses a threshold value.

6. A method to compensate for data defects in a memory device, comprising the steps of:

provide data signals to a data channel coupled to said memory device wherein said data channel determines a rotation of a plane of polarization from a sensed light reflected from a surface of a storage medium to retrieve data;

detecting said data defects with a detector channel coupled to said data channel, wherein said data defects are detected by analyzing an amplitude of a sensed light reflected from the surface of the storage medium;

generating defect pulses corresponding to said data defects; and providing said defect pulses to said data channel to compensate for said data defects.

7. The method of claim 6, wherein said memory device comprises a magneto-optical disk drive system and corresponding drive circuitry including said data channel and said detector channel.

8. The method of claim 6, wherein said step of providing data signals to a data channel comprises the step of providing a first signal to an inverting amplifier and providing a second signal to a first summing amplifier coupled to an output of the inverter for summing the inverted first signal with the second signal to provide an analog signal to a converter device.

9. The method of claim 8, wherein said step of detecting said data defects with a detector channel comprises the step of providing said first and second signals to a second summing amplifier to provide a reflectivity signal to a detector.

10. The method of claim 9, wherein said step of generating defect pulses corresponding to said data defects comprises the step of generating a coast when said reflectivity signal crosses a threshold value.

11. A system to compensate for data defects in a memory device, comprising:

means for providing data signals to a data channel coupled to said memory device, wherein said data channel determines a rotation of a plane of polarization from a sensed light reflected from a surface of a storage medium to retrieve data means for analyzing an amplitude of a sensed light reflected from the surface of the storage medium to detect said data defects with a detector channel coupled to said data channel;

means for generating defect pulses corresponding to said data defects; and means for providing said defect pulses to said data channel to compensate for said data defects.

* * * * *